United States Patent
Hinton et al.

(10) Patent No.: US 6,174,542 B1
(45) Date of Patent: Jan. 16, 2001

(54) DIETARY SUPPLEMENTS AND FOOD PRODUCTS FOR TREATING SYMPTOMS OF PMS

(75) Inventors: Deborah A. Hinton, Jacksonville; Jeri J. Greene, Orange Park, both of FL (US)

(73) Assignee: PMS Mood Food, Inc., Orange Park, FL (US)

(*) Notice: Under 35 U.S.C. 154(b), the term of this patent shall be extended for 0 days.

(21) Appl. No.: 09/345,957

(22) Filed: Jul. 1, 1999

Related U.S. Application Data

(60) Provisional application No. 60/091,459, filed on Jul. 1, 1998.

(51) Int. Cl.[7] .............................. A61K 47/00; A61K 9/48; A61K 9/20; A01N 65/00; A01N 59/06; A01N 43/40; A01N 25/00; A23L 1/30

(52) U.S. Cl. .................... 424/439; 424/195.1; 424/451; 424/464; 424/474; 424/682; 426/72; 514/345; 514/904; 514/905; 514/783

(58) Field of Search ................. 424/439, 195.1, 424/451, 464, 474, 682; 426/72; 514/345, 783, 904, 905

(56) References Cited

U.S. PATENT DOCUMENTS

| | | | |
|---|---|---|---|
| 5,498,631 | 3/1996 | Gorbach et al. | 514/756 |
| 5,565,199 * | 10/1996 | Page et al. | 424/195.1 |
| 5,569,459 | 10/1996 | Shlyankevich | 424/195.1 |
| 5,612,061 | 3/1997 | Rabkin | 424/602 |
| 5,612,320 | 3/1997 | Wurtman et al. | 514/54 |
| 5,654,011 | 8/1997 | Jackson et al. | 424/635 |
| 5,707,630 | 1/1998 | Morrow | 424/195.1 |
| 5,707,670 * | 1/1998 | Mahansho et al. | 426/73 |
| 5,760,014 | 6/1998 | Wurtman et al. | 514/54 |

FOREIGN PATENT DOCUMENTS

9803170 * 1/1998 (WO).

* cited by examiner

*Primary Examiner*—John Pak
*Assistant Examiner*—Alton Pryor
(74) *Attorney, Agent, or Firm*—Richard C. Litman

(57) ABSTRACT

A chocolate containing dietary, vitamin, mineral and herbal supplement, and food products containing the same, for treating, preventing, alleviating or managing symptoms associated with premenstrual syndrome (PMS) in woman. The chocolate containing supplement and food product containing the same comprises an effective amount of the following essential ingredients: kava kava and/or St. John's wort; cayenne, ginger and ginseng; chickweed and/or buchu and/or pyridoxine (vitamin $B_6$), wild yam, vitamin and mineral supplements. Examples of food products incorporating these essential ingredients are liquid beverages such as a shake, juice or cappucino; solid snack foods such as hard candies, soft candies, gum, granola bars, chocolate bars, cookies, chocolate brownies, ice cream sandwiches or chocolate cake; and semi-solid snack foods such as ice cream, sorbet or yogurt. In an alternative embodiment, the supplement can be formulated into a powder, liquid, gel, paste, tablet, capsule or coated tablet form, rather than a specific food product.

4 Claims, No Drawings

DIETARY SUPPLEMENTS AND FOOD PRODUCTS FOR TREATING SYMPTOMS OF PMS

CROSS-REFERENCE TO RELATED APPLICATION

This application claims the benefit of U.S. Provisional Patent Application Serial No. 60/091,459, filed Jul. 1, 1998.

BACKGROUND OF THE INVENTION

1. Field of the Invention

The present invention relates generally to dietary and herbal supplements and snack foods, and more particularly, to chocolate containing dietary, vitamin, mineral and herbal supplements, and food products containing the same, useful for treating, preventing, alleviating or managing symptoms associated with premenstrual syndrome (PMS) in women.

2. Description of Related Art

The term premenstrual syndrome, or PMS, is generally used to describe a group of physical and mental symptoms which occur cyclically beginning about seven to fourteen days prior to menses. Menstruation occurs in women from the age of about twelve to thirteen to, on average, until about forty seven years of age. It occurs at more or less regular intervals except during pregnancy and lactation. The normal menstrual cycle averages about twenty-eight days with some variation based upon the woman's genetic makeup, age, physical and emotional well being, as well as other factors. The duration of menstrual flow is variable but usually is between three and seven days. The symptoms of PMS are often so severe and widespread that the American Psychiatric Association has formally identified the diagnostic criteria for PMS in *Diagnostic and Statistical Manual of Mental Disorders*.

The specific etiology of PMS remains unknown, although many theories have been proposed. These theories include, but are not limited to: hormonal imbalances, hormonal deficiencies, vitamin deficiencies, disturbances of autonomic nervous system, salt and water imbalances, altered endogenous opiates such as endorphins and psychosomatic dysfunction, just to name a few. However, up to now, investigative studies of etiology have been inconclusive and sometimes conflicting. Most likely, PMS is multifactorial and probably also involves changes in neurohormones and neurotransmitters, which are difficult to observe, document and isolate in vivo. See, M. Ferin, R. Jewelewicz and M. Warren, *The Menstrual Cycle: Physiology, Reproductive Disorders and Infertility*, pp. 198–204 (1993).

Symptoms of PMS are varied and can range from mild to incapacitating. As many as seventy to ninety percent of all women have recurrent premenstrual syndrome, and as many as twenty to forty percent of these women suffer some degree of temporary physical and/or mental incapacitation. Some examples of mental symptoms a woman suffering from PMS may exhibit include difficulty in concentration, fatigue, change in appetite, irritability and depression. Some examples of physical symptoms a woman suffering from PMS may exhibit are increase or decrease in sleep, joint pain, cramps, bloating, edema, acne, constipation and breast tenderness.

It is theorized that some PMS manifestations such as mood and behavior disorders are induced by a drop in the level of biogenic amines in the central nervous system. Lower brain neurotransmitters such as serotonin have been implicated in the etiology of PMS. See Taylor, D. L. et al., Neuropsychobiology, 12:16 (1984). This can perhaps explain another symptom that many PMS suffers seem to exhibit which is the craving of chocolate or foods containing chocolate. Chocolate is a food that contains, among many other things, fat and sugar. Evidence suggests that a woman's cravings for chocolate lie in the body's biochemical need to increase or boost levels of endorphins and serotonin in the brain; chemicals whose levels are increased in the brain upon ingestion of chocolate. Chocolate also contains other agents such as phenylethylamine, theobromine and magnesium that appear to ameliorate some symptoms of PMS.

The physical, neurological and psychological symptoms of premenstrual syndrome are a major cause of suffering and discomfort to women, and cause substantial loss of time and efficiency in the workplace and can be a major disruption in a women's personal life. A number of prescription and over the counter pharmaceutical preparations, as well as dietary supplements are currently available which are designed to provide relief for one of more of the symptoms of PMS. However, the vast majority of these products include drugs such as antihistamines, nonsteroidal anti-inflammatories and diuretics that fail to provide adequate relief from the symptoms of PMS, including chocolate cravings, and usually have detrimental side effects. Most of the currently available PMS products fail to include the proper combination of herbs, vitamins and minerals delivered in a convenient, appetizing, appealing and ready to eat dietary food product. Examples of various PMS treatments somewhat representative of the prior art follow.

U.S. Pat. No. 5,612,061 issued on Mar. 18, 1997 to Rabkin discloses a composition and a method for the treatment of PMS containing calcium, magnesium, an analgesic and a diuretic.

U.S. Pat. No. 5,569,459 issued on Oct. 29, 1996 to Shlyankevich discloses pharmaceutical compositions for the treatment of PMS consisting of vitamins, minerals and herbal extracts capable of controlling the stimulation of estrogen production in women.

U.S. Pat. No. 5,498,631 issued on Mar. 12, 1996 to Gorbach et al. discloses a method for the treatment of PMS by administering a therapeutic dietary product comprising an effective amount of flavonoids, which are constituents of soy beans and other plants, and are believed to exert an estrogenic effect on the human body.

U.S. Pat. No. 5,654,011 issued on Aug. 5, 1997 to Jackson et al. discloses a method for treating PMS by administering dietary supplements comprising mostly vitamins and minerals.

U.S. Pat. No. 5,707,630 issued on Jan. 13, 1998 to Morrow discloses a tablet of an herbal compound for treating symptoms associated with PMS.

U.S. Pat. No. 5,760,014 issued on Jun. 2, 1998 and U.S. Pat. No. 5,612,320 issued on Mar. 18, 1997, both to Wurtman et al., disclose methods of alleviating or managing carbohydrate craving associated with PMS by administering a blend of rapidly digestible carbohydrates.

The prior art recognizes the multitude of symptoms, as well as the range in the degree of severity of the symptoms, associated with PMS, as attested by the numerous treatments available to woman suffering from PMS. However, none of the above inventions and patents, taken either singly or in combination, are seen to describe the instant invention as claimed; that is, a convenient, appetizing and ready to eat snack food capable of satisfying a woman's craving for chocolate, while delivering an effective amount of herbs, vitamins and minerals useful in treating, preventing, alleviating or managing symptoms of PMS.

SUMMARY OF THE INVENTION

The objects of this invention are achieved by dietary herbal, vitamin and mineral containing snack food products for treating, preventing, alleviating or managing symptoms associated with premenstrual syndrome (PMS) in woman, comprising an effective amount of the following essential ingredients: kava kava root or St. John's wort; cayenne, ginger and ginseng; chickweed or buchu or pyridoxine (vitamin $B_6$), and wild yam root. In a preferred embodiment, the snack food products will also contain chocolate, powder chocolate or a combination of ingredients that make up chocolate. Examples of snack food products incorporating an effective amount of these essential ingredients are liquid beverages such as shakes, juices or cappucinos; solid snack foods such as granola or chocolate bars, chocolate cookie, chocolate brownie, chocolate cake, hard or soft candies, or gum; or semi-solid snack foods such as ice cream or yogurt, just to name a few.

Accordingly, it is a principal object of the invention to provide a dietary snack food product that satisfies a PMS sufferer's craving for foods high in fat and sugar, such as chocolate, while delivering herbs, vitamins and minerals that can help alleviate, treat, prevent and manage symptoms associated with PMS.

It is another object of the invention to provide a dietary snack food product capable of alleviating, treating, preventing or managing symptoms associated with PMS that is in the form that any conventional foods are available, such as liquid beverages like a shake, juice or cappucino; solid snack foods such as granola bars, chocolate bars, cookies, chocolate brownies or chocolate cakes; or semi-solid snack foods such as ice cream or yogurt.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification.

DETAILED DESCRIPTION OF THE PREFERRED EMBODIMENTS

The present invention is a chocolate containing dietary, vitamin, mineral and herbal supplement, and food products containing the same, for treating, preventing, alleviating or managing symptoms associated with premenstrual syndrome (PMS) in woman. The supplement and food product containing the same comprise an effective amount of the following essential ingredients: kava kava root arid/or St. John's wort; wild yam root, cayenne, ginger root and ginseng root; chickweed and/or buchu and/or pyridoxine (vitamin $B_6$).

Information included herein was obtained from portions of the following texts, all of which are incorporated herein by reference: *The Encyclopedia of Medicinal Plants*, Andrew Chevallier (1996); *The Complete Family Guide to Natural Home Remedies*, edited by Karen Sullivan (1997); and *The Complete Family Guide to Homeopathy*, by Christopher Hammond (1995).

Cayenne, (*Capsicum frutescens*) a member of the solanaceae family, helps restore proper functioning of the body. In the preferred embodiment, the fruit of the cayenne pepper is used. One of the key active ingredients in cayenne is capsaicin, which is responsible for invigorating the body, stimulating blood flow, promoting sleep and aiding in digestion. The fruit of the cayenne pepper also contains flavonoids, magnesium, phosphorous, sulphur, potassium, iron and calcium, and is high in vitamins A, B-complex and C. A preferable effective amount of dried cayenne powder incorporated into a snack food product or dietary supplement of this invention is about 60 mg.

Ginger (*Zingiber officinale*), a member of the zingiberacea family, has antispasmodic properties to ease cramps in smooth and skeletal muscles. Ginger is also useful for alleviating muscular and psychological tension, diminishing uterine pain caused by menstruation, reducing inflammation, aiding in circulation, as well as having antiemetic and has analgesic properties. The ginger rhizome contains calcium, iron, magnesium, phosphorous, sodium, potassium and vitamins A, B-complex and C. A preferable effective amount of dry ginger root powder incorporated into a snack food product or dietary supplement of this invention is about 60 mg.

Kava kava (*Piper methysticum*) is a member of the piperacea family. The kava kava root has antianxiety properties, as well as muscle relaxant and analgesic activity. The key constituents of kava kava are resins containing kava lactones, including kawain and piperdine alkaloids. A preferable effective amount of dried kava kava root powder incorporated into a snack food product or dietary supplement of this invention is about 425 mg.

St. John's wort (*Hypericum perforatum*) is a member of the guttiferae family. St. John's wort has antispasmodic, anti-depressant, anti-inflammatory and analgesic properties. Some of the main active constituents of St. John's wort are flavonoids, carophyllene, hypericin and pseudohypericin. A preferable effective amount of dried St. John's wort extract incorporated into a snack food product or dietary supplement of this invention is about 425 mg.

Ginseng (*Panax ginseng*) is a member of the araliaceae family and is considered adaptogenic (helping the body to adapt to stress, fatigue or cold). Ginseng is considered a powerful stimulant; has stress fighting properties; is capable of restoring energy and improving endurance, and can increase concentration. The ginseng root contains, among many other compounds, triterpenoid saponins, ginsenosides, acetylenic compounds, panaxans and sesquiterpenes. A preferable effective amount of dried ginseng root powder incorporated into a snack food product or dietary supplement of this invention is about 175 mg.

Chickweed (*Stelaria media*) is a member of the caryophyllacea family. The chickweed plant has anti-inflammatory, body invigorating and stimulating properties. Chickweed contains vitamin C, flavonoids, coumarins and triterpenoid saponins. A preferable effective amount of dry chickweed powder incorporated into a snack food product or dietary supplement of this invention is about 255 mg.

Buchu (*Barosma betulina*) is a member of the rutaceae family. Buchu leaves have diuretic, urinary antiseptic and body stimulating properties, that can also help relieve gas, bloating and stimulate menstrual flow. Buchu leaves contain, among many other compounds, volatile oils, sulfur compounds, flavonoids and mucilage. A preferable effective amount of dried buchu leaves powder incorporated into a snack food product or dietary supplement of this invention is about 225 mg.

Wild yam (*Dioscorea villosa*) is a member of the dioscoreaceae family. The wild yam root and tuber have antispasmodic properties capable of easing menstrual cramps, as well as muscle relaxing, diuretic and anti-inflammatory properties. Key constituents of wild yam are starch and natural hormonal and steroidal compounds such as dioscin and beta-sitosterol. A preferable effective amount of dried wild yam root powder incorporated into a snack food product or dietary supplement of this invention is about 280 mg.

Examples of preferred embodiments of dietary supplement snack food products incorporating effective amounts of the essential ingredients are liquid beverages such as a shake, juice, drink or cappucino; solid snack foods such as soft and hard candies, gum, granola bars, chocolate bars, chocolate covered graham crackers, chocolate covered unsalted pretzels, moon pies, cup cakes, cookies, chocolate brownies, chocolate covered unsalted peanuts, chocolate covered cherries, chocolate covered raisins and chocolate cake; or semi-solid snack foods such as ice cream, sorbet or yogurt. In an alternative embodiment, the dietary supplement can be formulated into a powder, tablet, gel, paste, liquid, capsule or coated tablet dosage forms, rather than a specific food product.

The type, texture and consistency of the chocolate used in the snack food products can vary, and can be selected from, but not limited to the following: white, dark, milk, carob, sweetened and semi-sweetened. The chocolate used can also be low in fat or fat free if desired, and depending upon the kind of food product or formulation of the dosage form, the chocolate can be in a solid, semi-solid, liquid or powder form. Alternatively, naturally occurring or synthetic chocolate flavoring agents can be used to enhance, or even be substituted for the chocolate. Furthermore, ingredients and components derived from chocolate can be used to enhance, or even be substituted for chocolate.

The following are preferable compositions for preferred snack food product embodiments encompassed within the present invention:

EXAMPLE I

An 8 oz PMS chocolate bar comprising an appropriate amount of:
milk chocolate,
corn syrup,
sugar,
partially hydrogenated soybean oil,
milk,
cocoa powder,
malted barley,
lactose,
wheat flour,
egg whites,
soy protein,
calcium, preferably about 250 mg of calcium carbonate,
natural or artificial vanilla for flavoring,
unsalted peanuts; and the following preferred amounts for the essential ingredients of kava kava 425 mg and/or St. John's wort 425 mg; cayenne 60 mg, ginger 60 mg and ginseng 175 mg; chickweed 255 mg and/or buchu 225 mg and/or pyridoxine (vitamin $B_6$) 30 mg; wild yam 280 mg.

EXAMPLE II

An 8 oz PMS chocolate granola energy bar comprising an appropriate amount of:
granola (rolled oats, rolled whole wheat, sugar, partially hydrogenated cotton seed and soybean oil, skim milk and corn syrup),
semi sweet chocolate chips (sugar, chocolate, cocoa butter, dextrose, soy, lecithin as an emulsifier, vanilla as an artificial or natural flavor),
coconut,
enriched wheat flour (contains reduced iron, thiamin [Vitamin $B_1$] and riboflavin [vitamin $B_2$],
sugar,
vegetable shortening (partially hydrogenated soybean oil),
rice flour,
corn syrup solids,
glycerine,
brown sugar,
high fructose corn syrup,
natural and/or artificial flavoring,
baking soda,
whey,
malted barley flour,
soy lecithin,
calcium, preferably about 250 mg of calcium carbonate;
BHA and citric acid as preservatives, and the following preferred amounts for the essential ingredients of kava kava 425 mg and/or St. John's wort 425 mg; cayenne 60 mg, ginger 60 mg and ginseng 175 mg; chickweed 255 mg and/or buchu 225 mg and/or pyridoxine (vitamin $B_6$) 30 mg; and wild yam 280 mg.

EXAMPLE III

A 16 oz PMS chocolate drink comprising an appropriate amount of:
water,
dairy whey,
high fructose corn syrup,
non-fat milk,
corn syrup solids,
cocoa,
partially hydrogenated soybean oil,
sodium caseinate as a protein source,
tricalcium phosphate,
dipotassium phosphate,
xanthin gum,
mono and di-glycerides
vanilla as an artificial or natural flavor,
soy lecithin,
vitamin C, preferably about 100 mg,
calcium carbonate, preferably about 250 mg,
vitamin A, preferably about 500 I.U.,
niacin (vitamin $B_3$) , preferably about 20 mg,
vitamin D, preferably about 40 I.U.,
riboflavin (vitamin $B_2$) , preferably about 15 mg,
malt, and the following preferred amounts for the essential ingredients of kava kava 425 mg and/or St. John's wort 425 mg; cayenne 60 mg, ginger 60 mg and ginseng 175 mg; chickweed 255 mg and/or buchu 225 mg and/or pyridoxine (vitamin $B_6$) 30 mg; and wild yam 280 mg.

In Example III, the chocolate drink can also be in powderized form ready for reconstituting, preferably with water, to 16 oz.

In the preferred embodiment, the herbs are grown organically outdoors. Once harvested the herbs are preferably pulverized and cold compressed. Most importantly, only those herbs having certificates of safety and purity from the growers, as recognized by the U.S. Food and Drug Administration, are preferably used.

It is to be understood that the present invention is not limited to the sole embodiments described above, but encompasses any and all embodiments within the scope of the following claims.

What is claimed is:

1. A nutritional and herbal supplement comprising:

kava kava;

St. John's wort;

cayenne;

ginger;

ginseng;

chickweed;

buchu;

pyridoxine;

wild yam; and a component selected from the group consisting of chocolate, chocolate flavoring, components derived from chocolate, and mixtures thereof.

2. The supplement according to claim 1, wherein the supplement is in a dosage form selected from the group consisting of a tablet, powder, capsule, coated tablet, liquid, gel, and paste.

3. The supplement according to claim 1, further comprising vitamins and minerals.

4. The supplement according to claim 1, further comprising calcium.

* * * * *